US008100625B2

(12) United States Patent  (10) Patent No.: US 8,100,625 B2
Lutz  (45) Date of Patent: Jan. 24, 2012

(54) CONVEYOR TRAILER

(76) Inventor: David W. Lutz, Carlisle, PA (US)

(*) Notice: Subject to any disclaimer, the term of this patent is extended or adjusted under 35 U.S.C. 154(b) by 907 days.

(21) Appl. No.: 11/401,109

(22) Filed: Apr. 10, 2006

(65) Prior Publication Data

US 2007/0025833 A1   Feb. 1, 2007

Related U.S. Application Data

(60) Provisional application No. 60/670,941, filed on Apr. 13, 2005.

(51) Int. Cl.
*B60P 1/00*   (2006.01)
(52) U.S. Cl. ........................................ 414/510; 414/528
(58) Field of Classification Search .................. 414/510, 414/514, 440, 222.03, 528; 410/129, 130, 410/132, 133, 135
See application file for complete search history.

(56) References Cited

U.S. PATENT DOCUMENTS

| | | | | | |
|---|---|---|---|---|---|
| 2,264,157 | A | * | 11/1941 | Baker et al. | 414/518 |
| 3,722,717 | A | * | 3/1973 | Stryczek | 414/521 |
| 3,771,673 | A | * | 11/1973 | Moeller | 414/514 |
| 3,837,508 | A | * | 9/1974 | Stefanelli | 414/510 |
| RE31,060 | E | * | 10/1982 | Lutz | 414/788 |
| 4,927,316 | A | * | 5/1990 | Kordel | 414/510 |
| 6,129,500 | A | * | 10/2000 | Doyon | 414/528 |
| 6,679,371 | B2 | * | 1/2004 | Hooijen et al. | 198/750.1 |
| 2003/0159902 | A1 | * | 8/2003 | hooijen et al. | 198/301 |

* cited by examiner

*Primary Examiner* — Saul Rodriguez
*Assistant Examiner* — Glenn Myers
(74) *Attorney, Agent, or Firm* — The Webb Law Firm

(57) ABSTRACT

A conveyor trailer includes a trailer and a conveyor system. The conveyor system includes one or more belts movably mounted in the trailer. At least one bulkhead is connected to the belts. The bulkhead includes a drive assembly. At least one drive element is mounted in the trailer and is configured to engage the drive assembly to move the bulkhead and the belts connected thereto forwardly and/or rearwardly in the trailer.

3 Claims, 3 Drawing Sheets

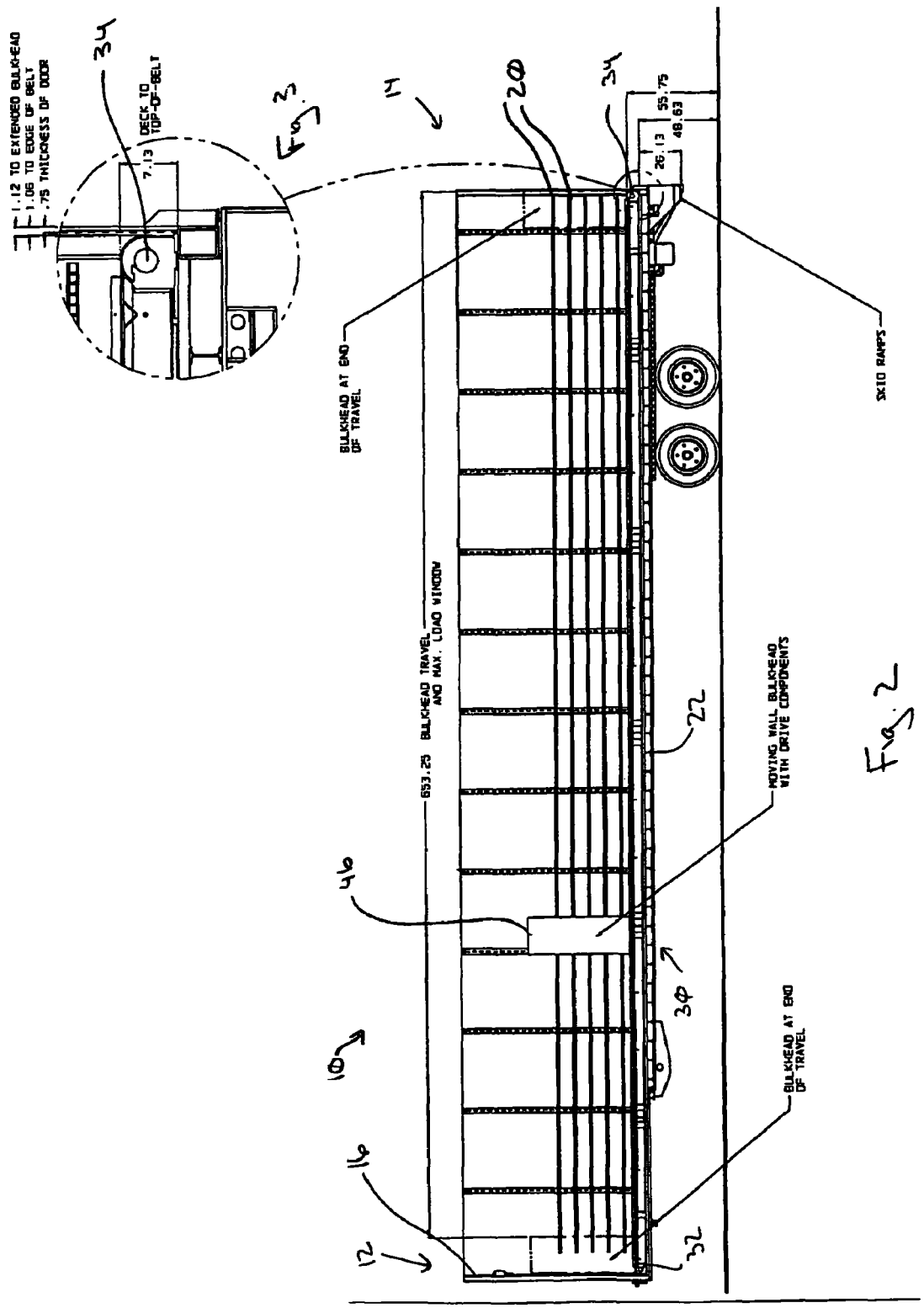

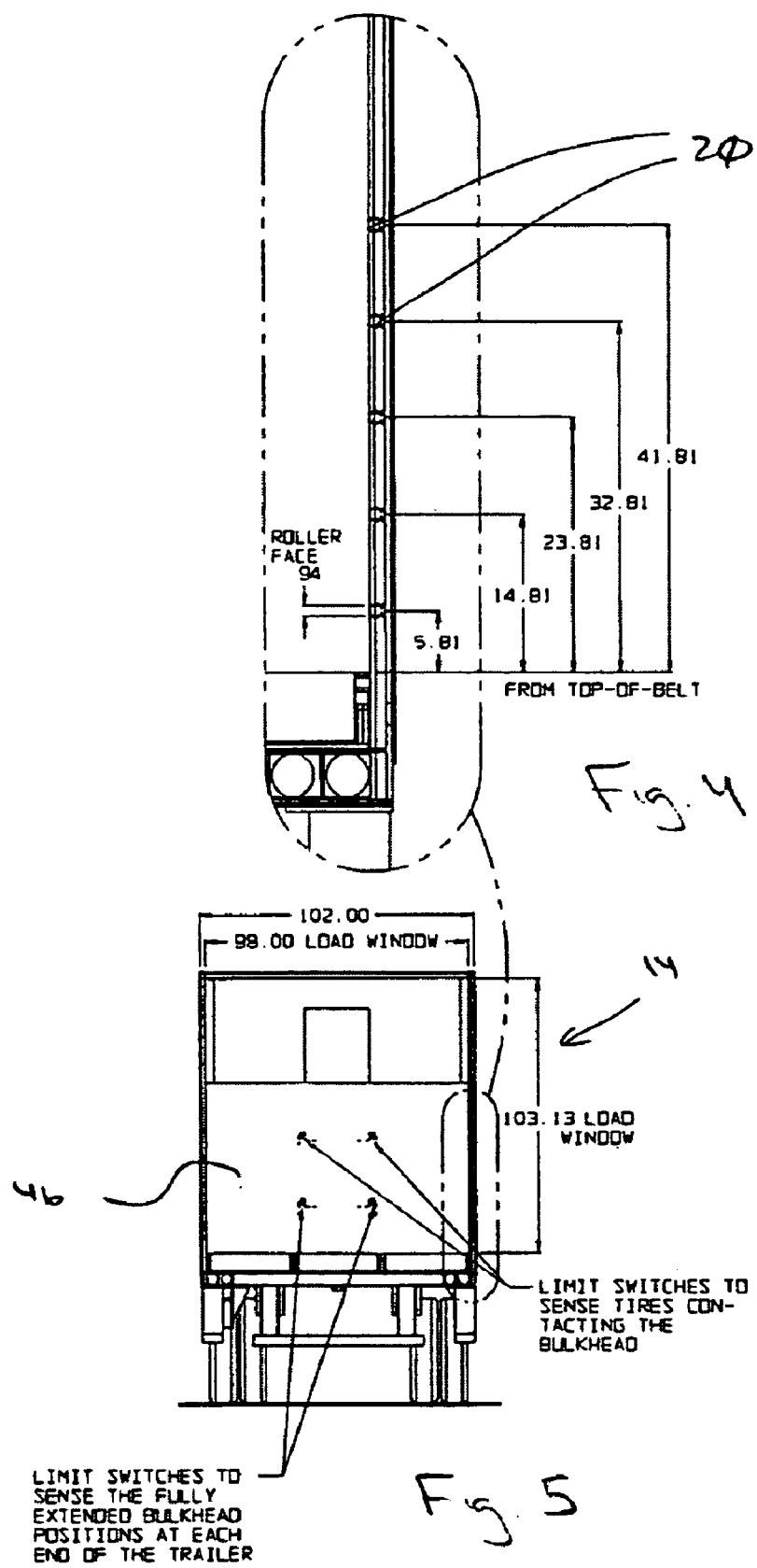

CONVEYOR TRAILER

CROSS REFERENCE TO RELATED APPLICATION

This application claims the benefits of U.S. Provisional Patent Application Ser. No. 60/670,941, filed Apr. 13, 2005, which application is herein incorporated by reference in its entirety.

BACKGROUND OF THE INVENTION

1. Field of the Invention

This invention relates generally to trailers for hauling goods and, in one particular embodiment, to a trailer having a conveyor to assist in loading and unloading the goods.

2. Technical Considerations

As will be appreciated by one skilled in the art of transporting goods, particularly by trailer trucks, a significant amount of time and energy is expended in loading and unloading goods from the trailer. In a conventional trailer truck, for example, the trailer is positioned at a loading dock and goods are wheeled or carried into the trailer. Typically, the trailer is loaded starting at the front end of the trailer and working toward the rear of the trailer until the trailer is full. This means that workers loading the trailer enter at the open rear of the trailer and carry the goods the length of the trailer until they reach the front wall to deposit the goods. Then they must walk all the way back through the trailer, exit the open rear of the trailer, gather more goods, and carry these new goods the length of the trailer back to the front wall or at least back to the position where the first load of goods was positioned. This is a very time consuming and labor intensive operation.

After the trailer is loaded, it is transported, typically by a truck, to a destination for unloading. The trailer can once again be positioned at a loading dock and the rear doors of the trailer opened. Workers begin to unload the goods from the rear of the trailer. However, as more and more goods are unloaded, the workers must walk farther and farther into the interior of the trailer to reach the goods and then carry them the length of the trailer and out the rear doors. This unloading procedure can continue until the last load of goods positioned at the front wall of the trailer is reached. The workers have to haul these final goods all the way along the length of the trailer and out the open rear doors. This unloading procedure is just as time consuming and labor intensive as the loading procedure.

Therefore, it would be advantageous to provide a container, such as a trailer, that reduces or eliminates at least some of the problems associated with loading and unloading conventional trailers.

SUMMARY OF THE INVENTION

A conveyor trailer of the invention includes a trailer and a conveyor assembly. The conveyor assembly includes at least one belt movably mounted in the trailer. At least one bulkhead is connected to the at least one belt. The bulkhead can include a drive assembly. At least one drive element is mounted in the trailer and is configured to engage the drive assembly to move the bulkhead and the at least one belt connected thereto forwardly and/or rearwardly in the trailer.

BRIEF DESCRIPTION OF THE DRAWINGS

The invention will be described below with reference to the accompanying drawing figures in which like reference characters identify like parts throughout.

FIG. 2 is a side, cut-away view of the trailer of FIG. 1;

FIG. 3 is an enlarged view of a rear end of a conveyor system of the invention;

FIG. 4 is a partial view of a side wall of the trailer of FIG. 1; and

FIG. 5 is a rear view of the trailer of FIG. 1.

DESCRIPTION OF THE PREFERRED EMBODIMENTS

Figure 1:
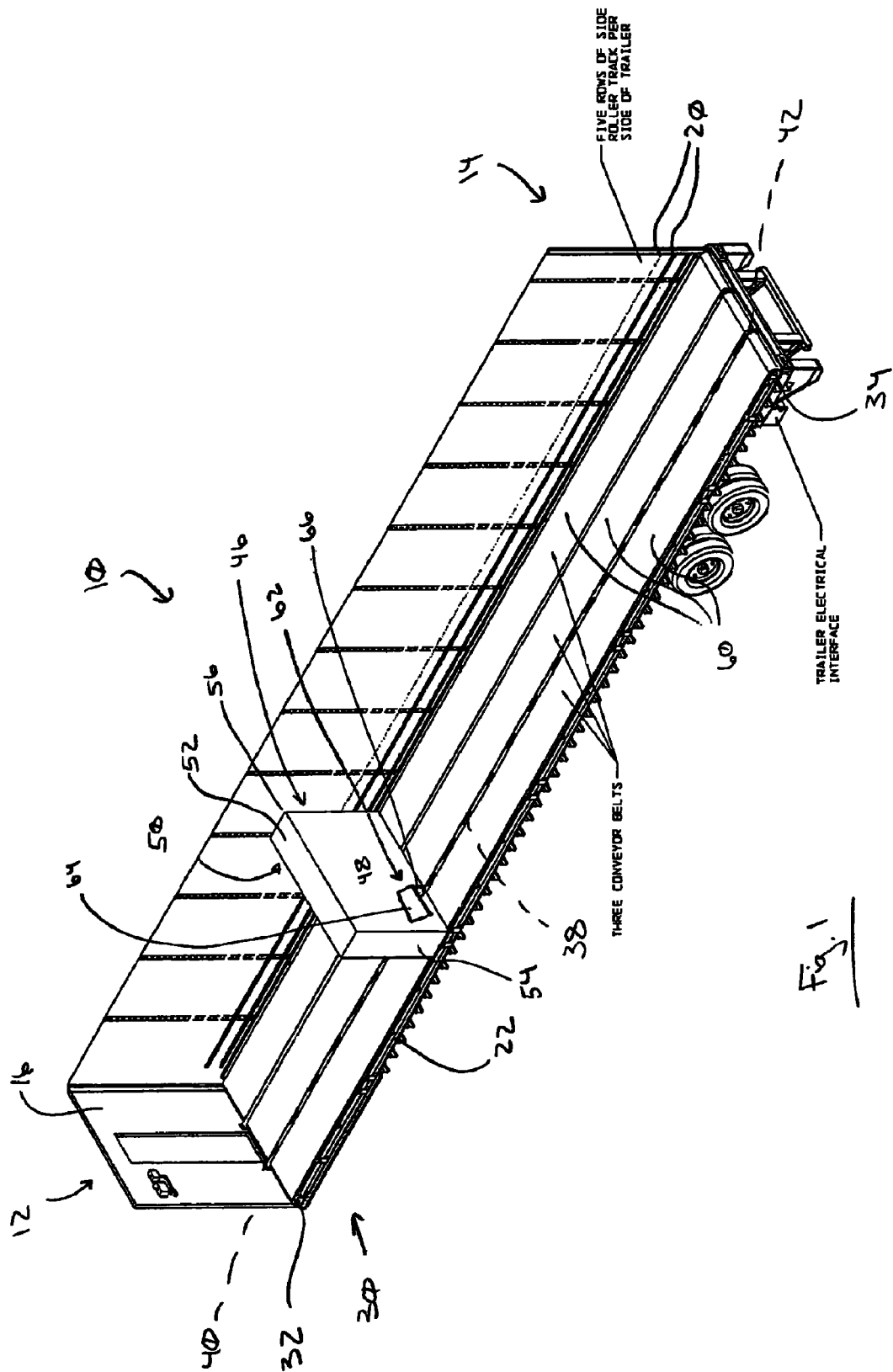
FIG. 1 is a perspective, cut-away view of a trailer incorporating features of the invention.

As used herein, spatial or directional terms, such as "top", "bottom", "left", "right", "up", "down", "front", "rear", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification, figures, and claims are to be understood as being modified in all instances by the term "about". Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. The dimensions shown on the attached drawings represent one embodiment of the invention and should not be considered as limiting. As used herein, the term "trailer" is not limited to conventional truck trailers but encompasses all types of shipping containers, such as but not limited to railway cars and shipping containers for air and sea transport.

As shown in FIGS. 1 and 2, a conveyor trailer 10 of the invention includes a front end 12 and a rear end 14. Typically, the front end 12 is closed by a front wall 16 which may or may not have an opening therein. The rear end 14 is typically closed by one or more conventional slidable or hinged doors to permit access to the interior of the trailer 10. The trailer 10 includes a pair of opposed side walls, one of which is shown in the illustrated embodiment. In one embodiment, the trailer 10 can include one or more rows of side rollers 20 attached thereto. The trailer 10 can further include a roof and a floor 22. The construction of conventional trailers will be well understood by one of ordinary skill in the art and, hence, will not be described in detail herein.

In the practice of the invention, a conveyor system 30 of the invention is mounted within the interior of the trailer 10. The conveyor system 30 includes one or more first rollers 32 rotatably mounted at or near the front end 12 of the trailer 10 and one or more second rollers 34 rotatably mounted at or near the rear end 14 of the trailer 10. The rollers 32, 34 can be, for example, conventional metal rollers rotatably mounted in brackets or stands attached to the trailer floor 22. The conveyor system 30 can be provided with the trailer 10 or a conventional trailer can be retrofitted to add the conveyor system 30.

One or more drive members, such as one or more drive chains 38, can be mounted in the trailer 10. In the illustrated embodiment, the drive chain 38 has a first end 40 secured at or near the front end 12 of the trailer 10 and a second end 42 secured at or near the rear end 14 of the trailer 10. The drive member can be, for example, a conventional drive chain having links configured to engage a sprocket assembly, as will be described in more detail below. Alternatively, the drive member can be a cable, rope, wire, toothed rail, or any device configured to engage a conventional drive assembly.

The conveyor system 30 includes a bulkhead 46 movably mounted in the trailer 10. The bulkhead 46 includes a front surface 46, a rear surface 50, a top 52, and a pair of spaced sides 54, 56. The bulkhead 46 can be, for example, rectangular in shape. The bulkhead 46 can be made of any desired material, such as metal.

One or more flexible belts 60 are attached to the bulkhead 46, for example, at or near the bottom of the bulkhead 46. The belts 60 are movably mounted on the rollers 32, 34. The belts 60 can be conventional conveyor belts and can be made of any desired material, such as but not limited to canvas, nylon, or the like.

A drive assembly 62 is carried on or mounted on the bulkhead 46. The drive assembly 62 can be of any conventional type configured to engage the drive member to move the bulkhead 46, as described below. In one embodiment, the drive assembly 62 includes a drive motor 64, such as a conventional electric or hydraulic drive motor, having a drive sprocket 66 configured to engage the drive chain 38.

Operation of the conveyor trailer 10 will now be described.

To load goods into the trailer 10, the trailer 10 can be positioned at a loading dock and the rear doors opened to permit access into the interior of the trailer 10. The drive assembly 62 can be activated to move the bulkhead 46 at or near the rear end 14 of the trailer 10. To move the bulkhead 46 and the belts 60 attached thereto, the drive motor 64 is engaged to turn the drive sprocket 66. The drive sprocket 66 engages the drive chain 38 to pull the bulkhead 46 in a desired direction (forward or rearward direction) with respect to the trailer 10. Since the belts 60 are connected to the bulkhead 46, as the bulkhead 46 moves, for example toward the rear 14 of the trailer 10, the belts 60 rotate around the rollers 32, 34 and also move toward the rear 14 of the trailer 10. The bulkhead 46 can initially be placed or moved near the rear end 14 of the trailer 10 so that one or more workers can begin loading goods onto the belts 60 in the area between the front 48 of the bulkhead 46 and the rear 14 of the trailer 10. When this belt area is full or near full, the drive motor 64 can be engaged to move the bulkhead 46 toward the front 12 of the trailer 10. This movement also causes the belts 60 to rotate or move toward the front 12 of the trailer 10 (to the left in FIG. 1) to carry the loaded goods already on the belts 60 away from the rear 14 of the trailer 10 and expose more belt surface for the loading of additional goods. The additional goods can be loaded onto the newly exposed belt surface and, when this surface is full, the drive motor 64 can again be activated to move the bulkhead 46 and belts 60 farther toward the front 12 of the trailer 10 to allow additional goods to be loaded. Thus, with the invention, workers do not have to carry the goods far into the trailer 10 but, rather, can stay on the loading dock or near the rear 14 of the trailer 10 to load the goods onto the belts 60 and then move the belts 60 to continue loading.

When the goods are loaded, the rear doors can be closed and the trailer 10 moved or transported to a desired location. To unload the goods, workers standing near the rear 14 of the trailer 10 can begin unloading the goods closest to the rear end 14 of the trailer 10. As the goods are unloaded from the area adjacent the rear doors, the drive motor 64 can be engaged to move the bulkhead 46 (and the belts 60 attached thereto) towards the rear 14 of the trailer 10 so that goods at or near the front end 12 of the trailer 10 are moved towards the rear end 14 of the trailer 10. Thus, workers need not enter far into the trailer 10 to unload the goods but, rather, can stand at or near the rear end 14 of the trailer 10 to unload the goods. The front wall 48 of the bulkhead 46 is particularly useful to ensure that the goods are transported on the belts 60 towards the rear 14 of the trailer 10. The front wall 48 of the bulkhead 46 pushes any goods that may slip on the belts 60 toward the rear 14 of the trailer 10 to ensure that no goods are left behind. The sides 54, 56 of the bulkhead 46 can contact the side rollers 20 to ease movement of the bulkhead 46 through the trailer 10. The bulkhead 46 is particularly useful when unloading individual goods, i.e., goods not boxed or crated. An example of such goods is vehicle tires. The bulkhead 46 serves to push the tires toward the rear 14 of the trailer 10 and helps prevent individual tires being left behind.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A conveyor trailer, comprising:
    a trailer having opposed side walls;
    a plurality of first rollers rotatably mounted at or near a front end of the trailer and a plurality of second rollers rotatably mounted at or near a rear end of the trailer;
    a plurality of endless flexible belts movably mounted around the first rollers and second rollers, with a gap located between adjacent flexible belts;
    a bulkhead connected to the belts;
    at least one stationary drive chain having a first end mounted at or near the front end of the trailer and a second end mounted at or near the rear end of the trailer, wherein the stationary drive chain is spaced from the opposed side walls and is not directly connected to the side walls, and wherein the drive chain is aligned with the gap between two adjacent flexible belts; and
    a drive assembly mounted on the bulkhead, the drive assembly comprising at least one drive motor having a drive sprocket aligned with the gap between two adjacent flexible belts and configured to engage the at least one drive chain such that rotation of the drive sprocket moves the bulkhead and the belts connected thereto forwardly and/or rearwardly in the trailer.

2. The conveyor trailer of claim 1, wherein the drive motor is selected from an electric motor or a hydraulic motor.

3. The conveyor trailer of claim 1, wherein the trailer includes side walls with at least one row of side rollers mounted thereon.

* * * * *